(12) United States Patent
Duffy

(10) Patent No.: US 8,178,781 B2
(45) Date of Patent: May 15, 2012

(54) APPARATUS FOR PROTECTING CABLE TRAYS, CONDUITS AND/OR CABLES

(76) Inventor: William Christopher Duffy, Thornhill (CA)

( * ) Notice: Subject to any disclaimer, the term of this patent is extended or adjusted under 35 U.S.C. 154(b) by 522 days.

(21) Appl. No.: 12/363,230

(22) Filed: Jan. 30, 2009

(65) Prior Publication Data
US 2010/0193238 A1    Aug. 5, 2010

(51) Int. Cl.
*H02G 3/04* (2006.01)

(52) U.S. Cl. ....... 174/70 C; 174/68.1; 174/95; 174/101; 439/207; 138/92

(58) Field of Classification Search .............. 174/70 C, 174/21 R, 24, 68.1, 47, 75 R, 95, 101, 371; 52/220.7; 439/207; 248/205.1; 138/92, 138/162
See application file for complete search history.

(56) References Cited

U.S. PATENT DOCUMENTS

| | | | | |
|---|---|---|---|---|
| 1,986,965 A | * | 1/1935 | Frank | 174/72 C |
| 1,992,574 A | * | 2/1935 | Jenkins | 174/72 C |
| 3,003,794 A | * | 10/1961 | Burley | 285/179.1 |
| 3,351,699 A | * | 11/1967 | Merckle | 174/371 |
| 4,951,716 A | * | 8/1990 | Tsunoda et al. | 138/162 |
| 5,024,251 A | * | 6/1991 | Chapman | 138/92 |
| 5,753,855 A | * | 5/1998 | Nicoli et al. | 174/504 |
| 5,898,132 A | * | 4/1999 | Lee | 174/101 |
| 6,143,984 A | * | 11/2000 | Auteri | 174/68.3 |
| 6,156,977 A | * | 12/2000 | Benito-Navazo | 174/97 |
| 6,188,024 B1 | * | 2/2001 | Benito-Navazo | 174/97 |
| 7,501,576 B2 | * | 3/2009 | Gagliardi | 174/72 A |

* cited by examiner

*Primary Examiner* — Dhirubhai R Patel
(74) *Attorney, Agent, or Firm* — Bennett Jones LLP

(57) ABSTRACT

An enclosure apparatus for protecting cable trays, electrical cables, pipes and/or includes other control equipment. The enclosure apparatus includes one or more linear sections and/or elbow or corner sections. The sections are configured to be joined together to form longer sections or transition sections. Each of the sections includes a protective outer layer that is fire resistant and/or blast resistant. According to an embodiment, one or more the sections includes a panel or re-enterable section that can be removed for accessing the interior of the enclosure, for example, the cables, pipes or control equipment, or for assembling the sections around an existing cable installation.

6 Claims, 17 Drawing Sheets

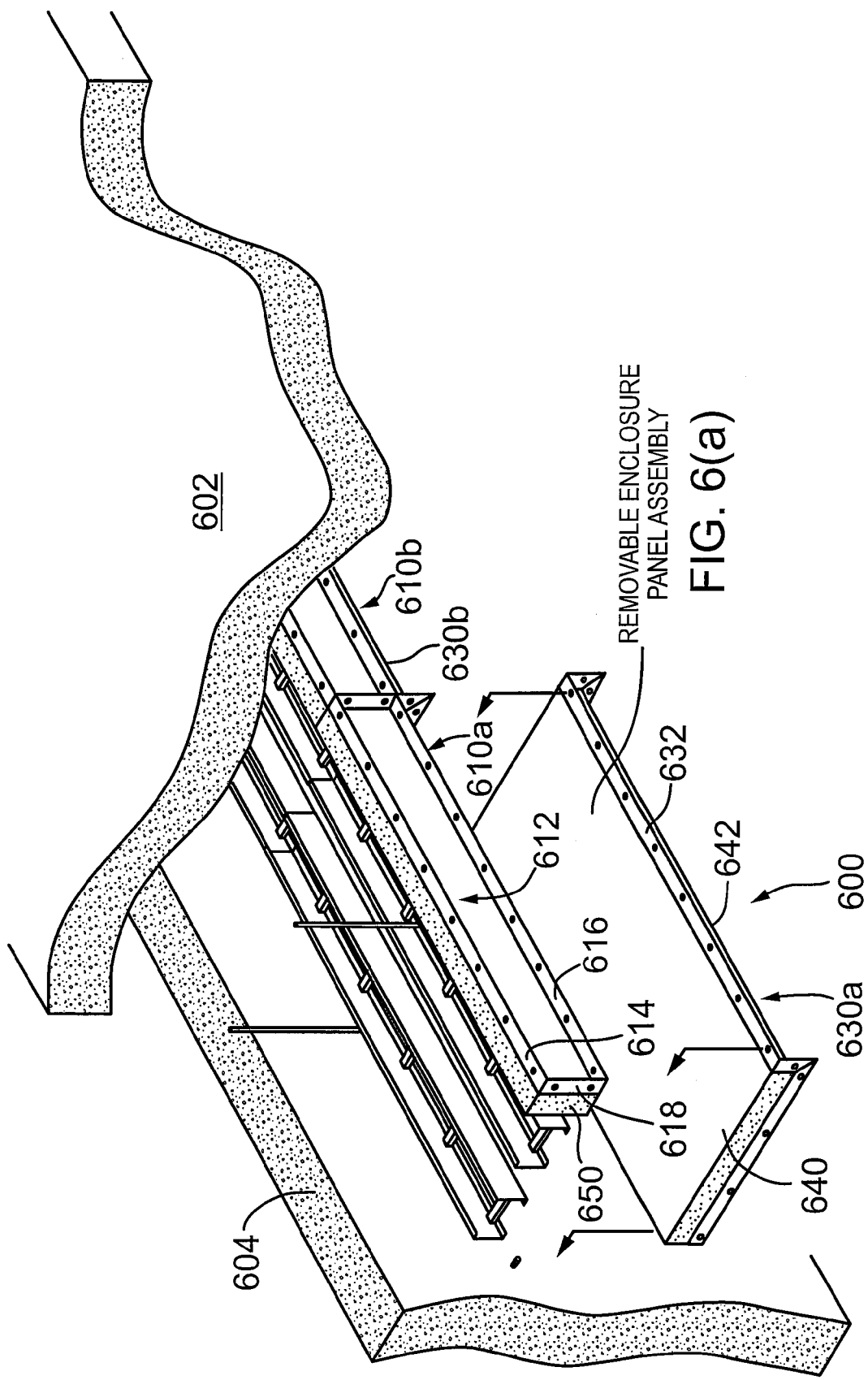

TYPE 1-BUTT JOINT

SECTION A-A

TYPE 2-STEPPED JOINT

SECTION B-B

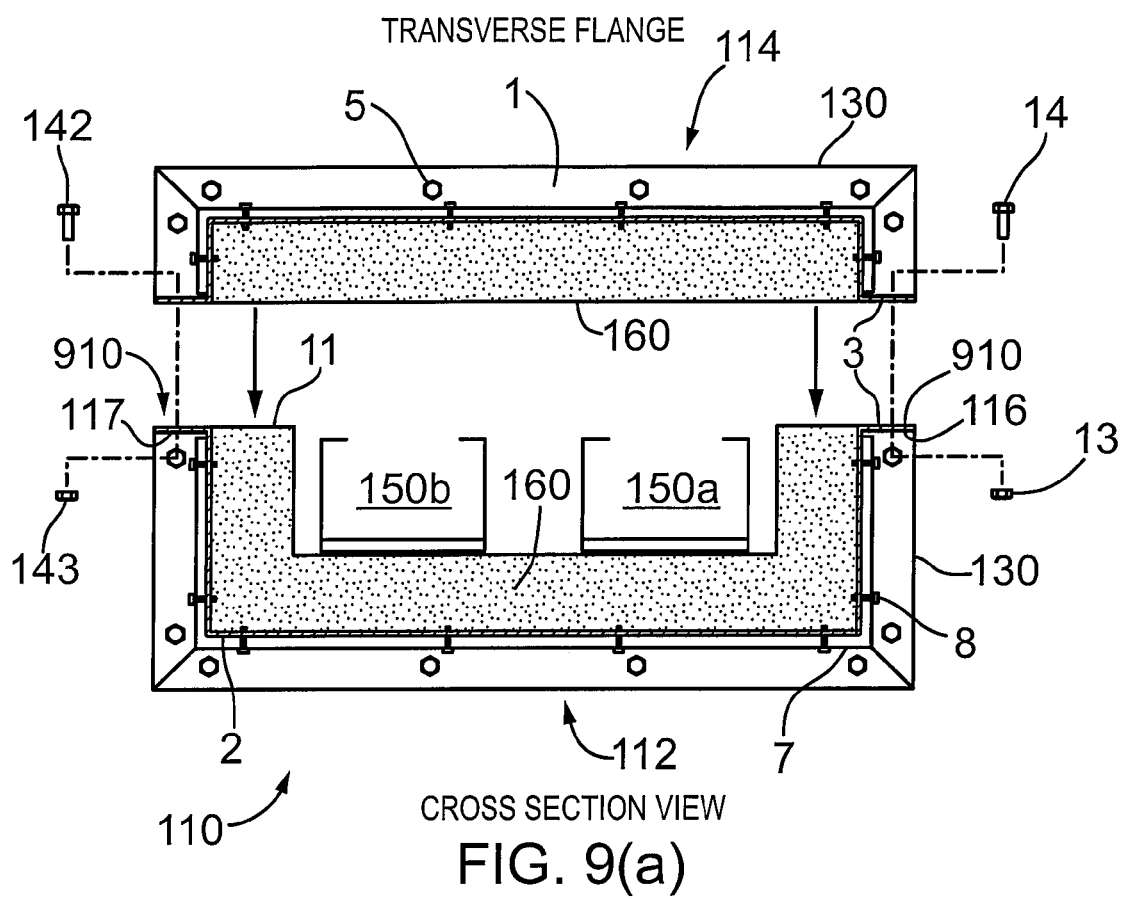
FIG. 9(a) CROSS SECTION VIEW
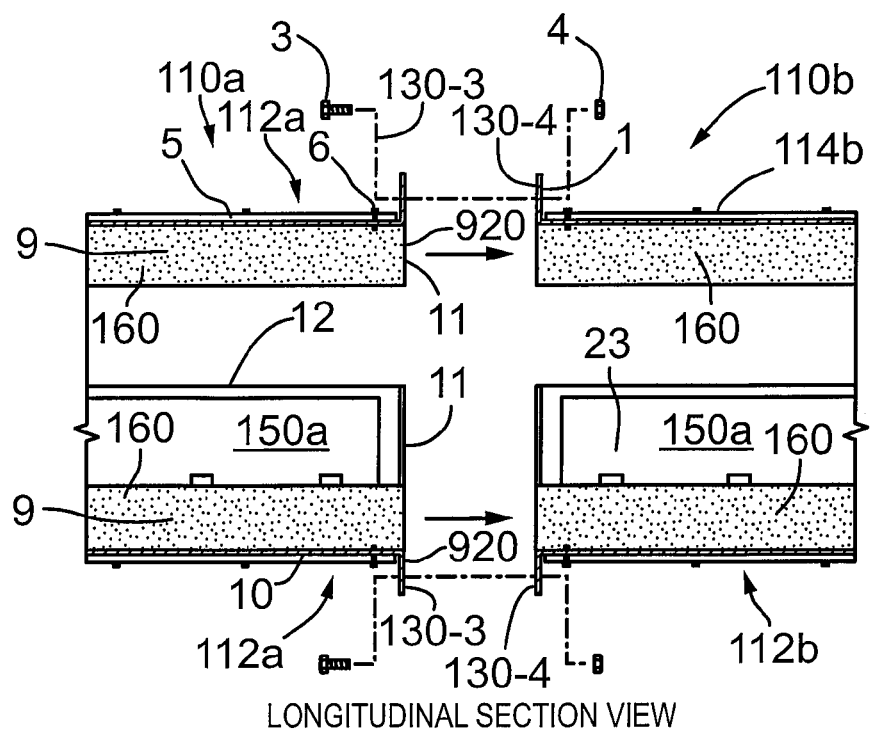
FIG. 9(b) LONGITUDINAL SECTION VIEW

APPARATUS FOR PROTECTING CABLE TRAYS, CONDUITS AND/OR CABLES

FIELD OF THE INVENTION

The present application relates to protective enclosures or assemblies, and more particularly, to re-enterable or accessible enclosure apparatus for protecting cables, cable trays, conduits and the like.

BACKGROUND OF THE INVENTION

Power and control cable installations typically require some form of protection from environmental agents and hazards. For instance, power and control cables installed in nuclear generating plants or petrochemical facilities require protection from fire and explosion hazards. The protection is required to ensure that cables remain intact after an explosion or during a fire event, so that the processes and systems can remain operational, and/or be shut down in a controlled manner.

The U.S. Nuclear Regulatory Commission (NRC), for example, requires additional protection safeguard, such as redundant trains or cable trays for Class 1E power and control systems. For instance, NRC Regulations 10 CFR 50, Appendix R, mandate that "One train of equipment necessary to achieve hot shutdown from either the control room or emergency control station(s) must be maintained free of fire damage by a single fire, including an exposure fire" for a 'hot' or operational shutdown of a facility. It will be appreciated that as the required redundant trains for a hot shutdown are often located within a common fire area in close proximity to each other, e.g. with less than 20 foot separation, the redundant trains must be separated by a barrier having a 3-hour fire rating to ensure that one of the redundant trains remains free of fire damage and operational. According to the NRC, if the fire area with the redundant trains is protected with an automatic fire suppression system, then the 3-hour fire rating can be reduced to a 1-hour fire rating.

In oil refineries and chemical plants, an explosion is typically the precursor to and one of the major causes of fires. The construction of the enclosure systems protecting the cable trays need to be robust to ensure the fire resistance of the enclosure is not compromised as a result of blast pressure or debris impact arising from an explosion or flash fire in the plant. Maintaining the integrity and operability of the cables after an explosion or fire allows plant or emergency personnel to perform an orderly shutdown of the affected systems, for instance, from the safety of a fire-rated or protected control room, which may also include equipment for monitoring and controlling other plant processes and equipment. It will be appreciated that the ability to continue to monitor and shut down other systems or processes in the vicinity, which could lead to further failures or explosions, provides emergency personnel (e.g. fire fighters) with the opportunity to extinguish the fire and minimize further plant damage.

In view of the importance of providing protective enclosures for cables and the like, there remains a need for improvements in the art.

BRIEF SUMMARY OF THE INVENTION

The present invention comprises embodiments for enclosures and protective apparatus for protecting cables, cable trays, conduits and the like. According to an aspect, the protective enclosures comprise re-enterable or accessible apparatus.

According to an embodiment, the present invention provides an apparatus for enclosing one or more cable trays, the apparatus comprises: an enclosure having one or more exterior walls, and each of the one or more exterior walls comprising a protective material; the one or more exterior walls having an interior surface; an insulation layer affixed to the interior surface of at least one of the one or more exterior walls; and an air gap formed to span at least a portion of the space between the insulation layer on the interior surface of the at least one of the one or more exterior walls.

According to another embodiment, the present invention provides an enclosure for enclosing one or more cable trays, the enclosure comprises: a frame configured for supporting one or more exterior panels, and each of the exterior panels comprising a protective material; the one or more exterior panels having an interior surface; an insulation layer affixed to the interior surface of at least one of the one or more exterior panels; an air gap formed to span at least a portion of the space between the insulation layer on the interior surface of the at least one of the one or more exterior panels; and a removable panel for accessing the interior of the enclosure.

According to another embodiment, the present invention provides an apparatus for enclosing control equipment, the apparatus comprises: a lower section having a longitudinal flange; an upper section having a longitudinal flange configured for coupling to the longitudinal flange of the lower section to join the upper section and the lower section into an enclosure; the lower section includes one or more exterior panels formed from a protective material; the upper section includes one or more exterior panels formed from the protective material or another protective material; the lower section includes a transverse flange configured for joining to another lower section; and the upper section includes a transverse flange configured for joining to another upper section.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments according to the present application, and in which:

FIG. 6(a) shows a cable tray or conduit enclosure according to another embodiment of the present invention;

FIG. 9(a) shows an end view of another joint configuration for the cable tray or conduit enclosure according to an embodiment of the present invention;

FIG. 9(b) shows a side view of the joint configuration of the cable tray in FIG. 9(a);

Like reference numerals indicate like or corresponding elements in the drawings.

DETAILED DESCRIPTION OF THE EMBODIMENTS

Figure 1A:
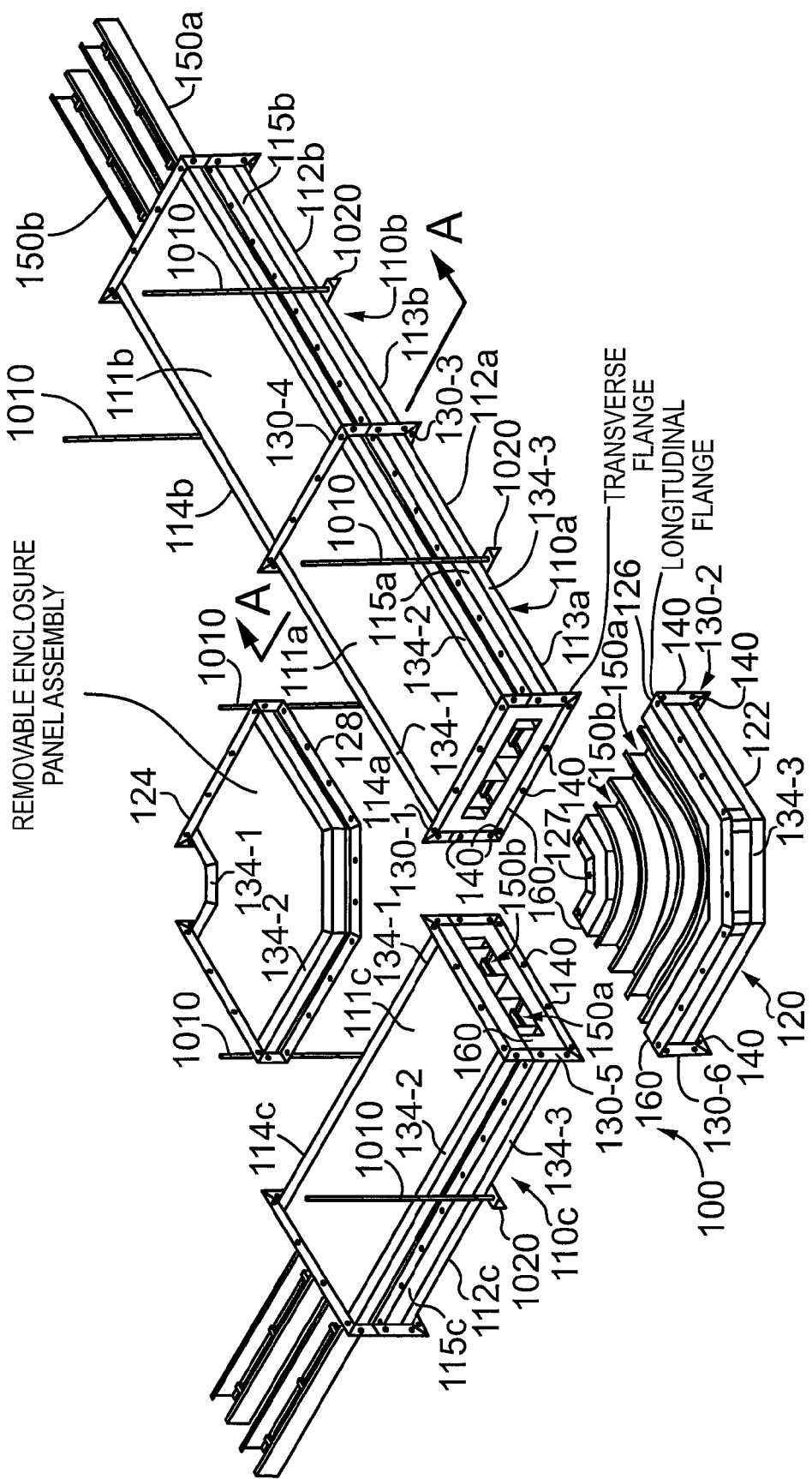
FIG. 1(a) is an exploded perspective view of a cable tray or conduit enclosure according to an embodiment of the present invention.
Figure 1B:
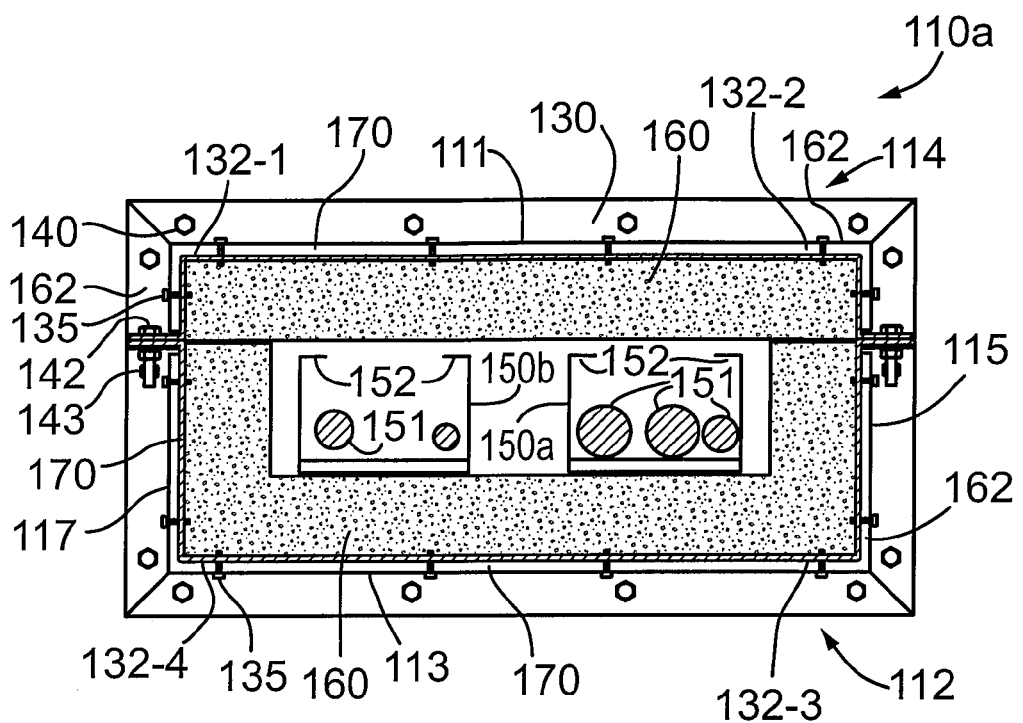
FIG. 1(b) is an end view of a section of the cable tray enclosure of FIG. 1(a) according to an embodiment of the present invention.

Reference is first made to FIGS. 1(a) and 1(b), which show a cable tray or conduit enclosure system or apparatus according to an embodiment of the invention. The cable tray or conduit enclosure is indicated generally by reference 100 and according to an embodiment comprises a re-enterable or accessible mechanism or configuration, as will be described in more detail below. Embodiments of the enclosure system or apparatus according to the present invention are suitable for protecting and/or enclosing electrical cables and/or control lines, oil and gas pipes, pressurized control lines, and other control equipment or systems as will be apparent to those skilled in the art.

As depicted in FIG. 1(a), the enclosure assembly 100 may comprise one or more sections, which according to an embodiment include straight or linear sections 110, indicated individually by 110a, 110b and 110c in FIG. 1(a), and a corner or transition section 120, indicated individually by reference 120a in FIG. 1(a). According to an embodiment, the linear sections 110 comprise top 111, bottom 113 and side 115, 117 panels, sheets or coverings and are fabricated from a fire and/or blast resistant material. For a fire resistant application, the outer coverings 111, 113, 115, 117 may comprise a flexible fire resistant material, such as high temperature textiles, coated glass fibre cloth, and other suitable fire resistant sheet material or panels. For a blast resistant application, the outer coverings 111, 113, 115, 117 comprise a rigid board or sheet fabricated from a material with sufficient strength to resist the required blast overpressures. Suitable materials include steel, stainless steel, and cementicious composite panels in thicknesses engineered for the particular protection specifications. Such materials will typically be suited for both blast and fire resistant protection.

Figure 2B:
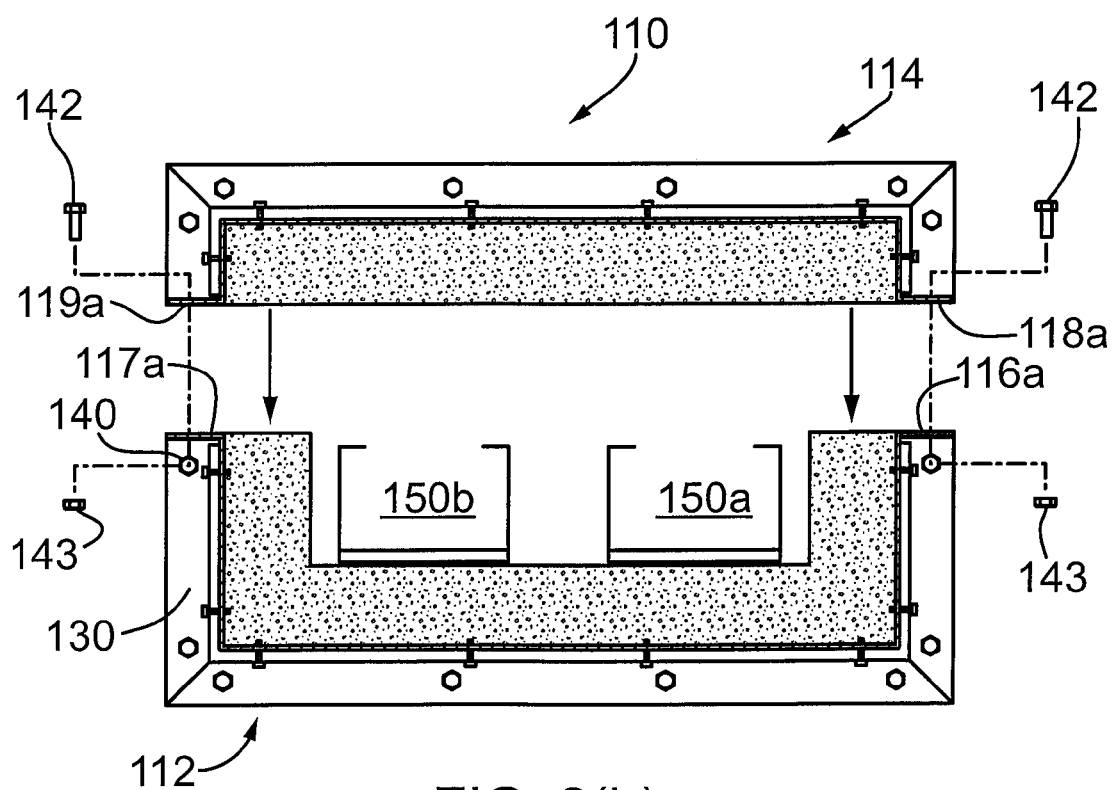
FIG. 2(b) shows an end view of the cable tray enclosure of FIG. 2(a) according to an embodiment of the present invention.

According to an embodiment, the sections 110, 120 include transverse flanges 130 at each end which are configured for joining or coupling the respective sections 110 or 120 to each other. For the configuration depicted in FIG. 1(a), the linear section 110a includes a first transverse flange 130-1 which mates or abuts with a corresponding transverse flange 130-2 on the corner or transition section 120. The linear section 110a includes a second transverse flange 130-3 at its other end which mates or couples to a corresponding transverse flange 130-4 on the second linear section 110b. Similarly, the corner section 120 includes a transverse flange 130-6 at the other end which mates with a transverse flange 130-5 on the linear section 110c. According to an embodiment, the transverse flanges 130 are configured with holes or apertures indicated generally by reference 140 (as indicated in FIGS. 1(a) and 1(b)) for receiving fasteners. The fasteners may comprise any suitable fastener, such as a bolt 142 and a nut 143 as indicated in FIG. 2(b), a rivet connection, and other types of releasable or permanent fasteners as will be familiar to those skilled in the art.

Referring to FIG. 1(b), the transverse flanges 130 for each section are connected or coupled together with longitudinal members 132 to form a rigid frame or support structure indicated generally by reference. According to embodiment, the longitudinal members 132 comprise four members 132-1, 132-2, 132-3, 132-4 (visible in FIG. 1(b), which are joined, for instance welded, with the respective transverse flanges 130-1 and 130-3 to form a rectangular shaped frame. As shown in the sectional view of FIG. 1(b), the outer covering panels or sheets 111, 113, 115, 117 (e.g. fire and/or blast resistant materials) are attached or connected to the respective longitudinal members 132 (e.g. to the exterior of the rigid frame) using screws 135 or other suitable fasteners, adhesives or welding techniques for weldable products. The frame or support structure components can be fabricated from individual steel or stainless steel members (e.g. single formed L-sections, or Z-sections for the re-enterable embodiment as described in more detail below) that are joined using fasteners or suitable welding techniques. It will be appreciated that other types of materials and/or joining or fastening methods, which provide the required strength to withstand thermal heating and/or blast loads, can be used. According to embodiments, the outer covering panels 111, 113, 115 and 117 comprise fire and/or blast resistant materials, including, textiles, coated textiles, boards, metallic sheets, composite panels and the like, with the required mechanical properties to achieve the level of fire and/or blast protection required for the particular application.

According to another embodiment, the linear 110 and corner 120 sections include corner flashings for each of the corners indicated by references 134-1, 134-2, 134-3 and 134-4 (not visible in FIG. 1(a)). The corner flashings 134 function to prevent blast pressures from getting under the outer covering or panel edges, and possibly lifting or detaching the panels from the frame structure during a blast event. The corner flashings 134 can be attached to the respective longitudinal members 132 using the screw fasteners 135 or other screws or suitable fasteners. For a fire resistant application, corner flashings 134 can be installed in a similar manner to provide additional support and/or retention of the lighter or flexible materials utilized.

According to another aspect and as depicted in FIGS. 1(a) and 1(b), each of the sections 110, 120 are configured with one or more cable trays or conduits. The cable tray or conduit is indicated generally by reference 150 and is configured to provide a channel or recess for holding and/or running cables (indicated generally by reference 151 in FIG. 1(b)) within the corresponding section 110, 120. For the embodiment depicted in FIGS. 1(a) and 1(b), the sections 110, 120 are configured with two cable trays or conduits 150, indicated individually by references 150a and 150b. The cable trays or conduits 150 are configured in the respective sections 110, 120 to substantially align and form a continuous channel or path when the respective sections 110, 120 are joined or coupled together, for example, the first section 110a joined to the second section 110b at one end and joined to the corner section 120 at the other end of the first section 110a. As depicted in FIG. 1(a), the cable tray or conduit(s) 150 for the corner section 120 are curved to allow the bending of the cable(s) without kinking or sharp corners. According to another aspect, the cable trays 150 can have an upper flange or lip 152, which is configured to keep or hold the cables in the tray(s) 150.

According to another embodiment, the linear 110 and corner 120 sections are configured with the cable tray(s) 150 with an insulation material or compound indicated generally by reference 160 in FIGS. 1(a) and 1(b). For enclosures 100 intended for fire resistance applications, the insulation is attached to the internal surfaces of the linear 110 and corner 120 sections to provide sufficient thermal protection to the interior of the enclosure 100, e.g. control cable(s) and/or equipment. According to an embodiment, the cable tray(s) or conduit(s) 150 are formed from steel and comprise a channel configuration as shown. For such implementations, the insulation 160 comprises a material which is sufficiently dense to support the loading or weight of the cable tray(s) 150 and the installed control cables. According to one implementation, the insulation material 160 comprises a calcium silicate or mineral fibre compound, for example, formed as panels, with sufficient density and thickness to provide the thermal protection and meet the loading requirements. If the enclosure 100 includes an internal support structure or other support system to distribute the load of the cable tray(s) 150 to the walls of the sections 110, 120, then the insulation material 160 may comprise a lower density material.

Referring to FIG. 1(b), the insulation material 160, for example, in the form of panels, is bonded or otherwise affixed to the interior surface(s) of the respective linear and corner sections 110, 120 using a bonding material 162. The bonding material 162 used will vary according to the composition or type of insulation material 160. For instance, calcium silicate insulation panels can be held in place using sodium silicate based adhesives, Room Temperature Vulcanization or RTV type adhesives, silicon adhesives, and other suitable high temperature rated adhesives. According to another aspect, the bonding material 162 is selected to have sufficient bonding strength to hold the insulation in place when the sections 110, 120 are shipped partially assembled, disassembled in the field, or when the re-enterable feature is utilized as described in more detail below.

According to an embodiment and as illustrated in FIG. 1(b), the insulation 160 is affixed to the interior of the section 110 using the bonding material 162 and one or more air gaps indicated generally by reference 170 are created. The air gap 170 is created between the insulation 160 and the outer fire and/or blast resistant coverings or sheets 111, 113, 115. According to one aspect, the air gap(s) 170 serves to provide a thermal barrier. According to another aspect, the air gap(s) 170 forms a cavity or void in which the outer covering 111, 113, 115 can deflect, for example, in reaction to blast loads, without impacting or possibly damaging the insulation material 160 mounted in the interior of the section 110, 120.

Figure 2A:
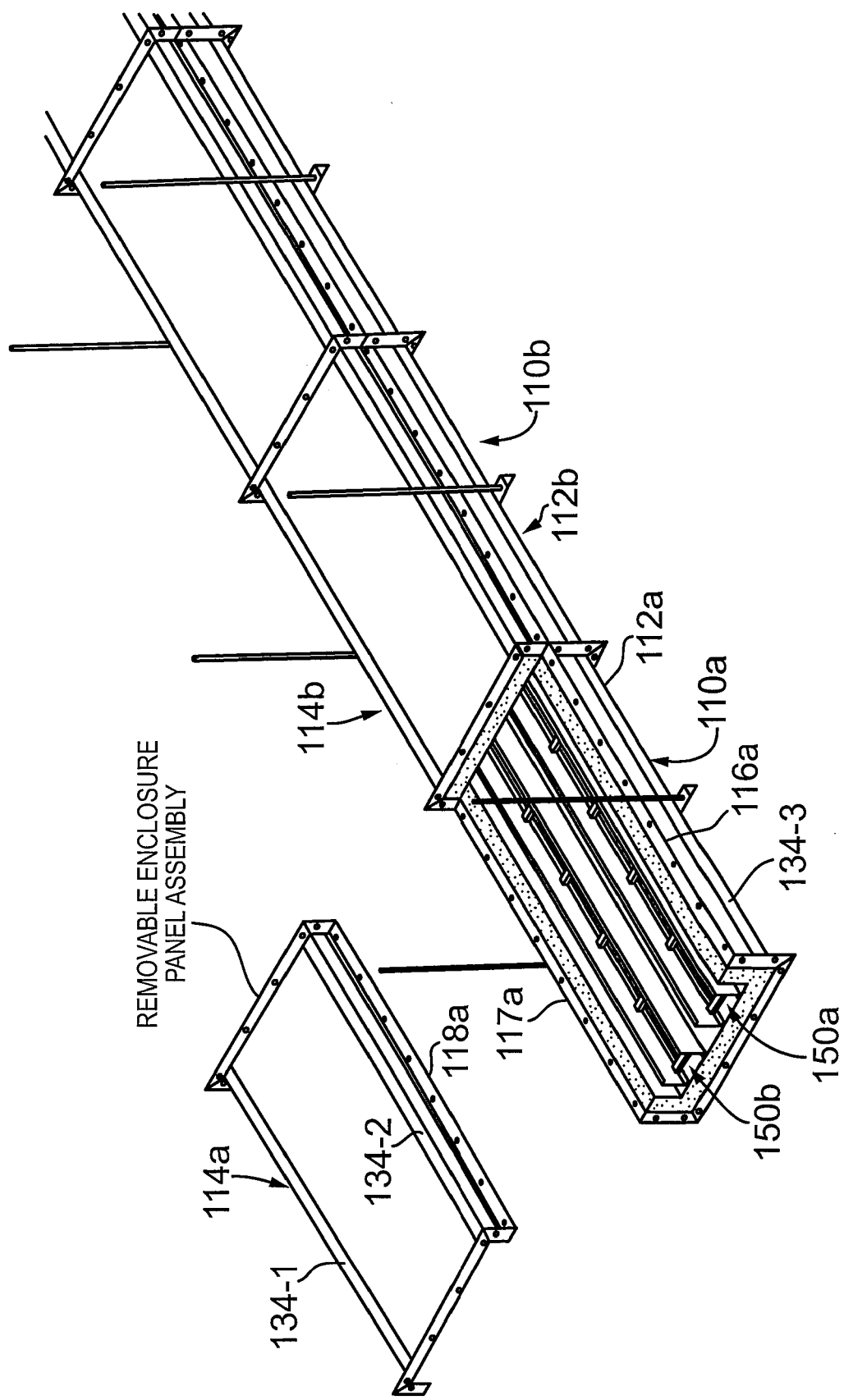
FIG. 2(a) is shows a cable tray or conduit enclosure with a removable panel according to an embodiment of the present invention.
Figure 8A:
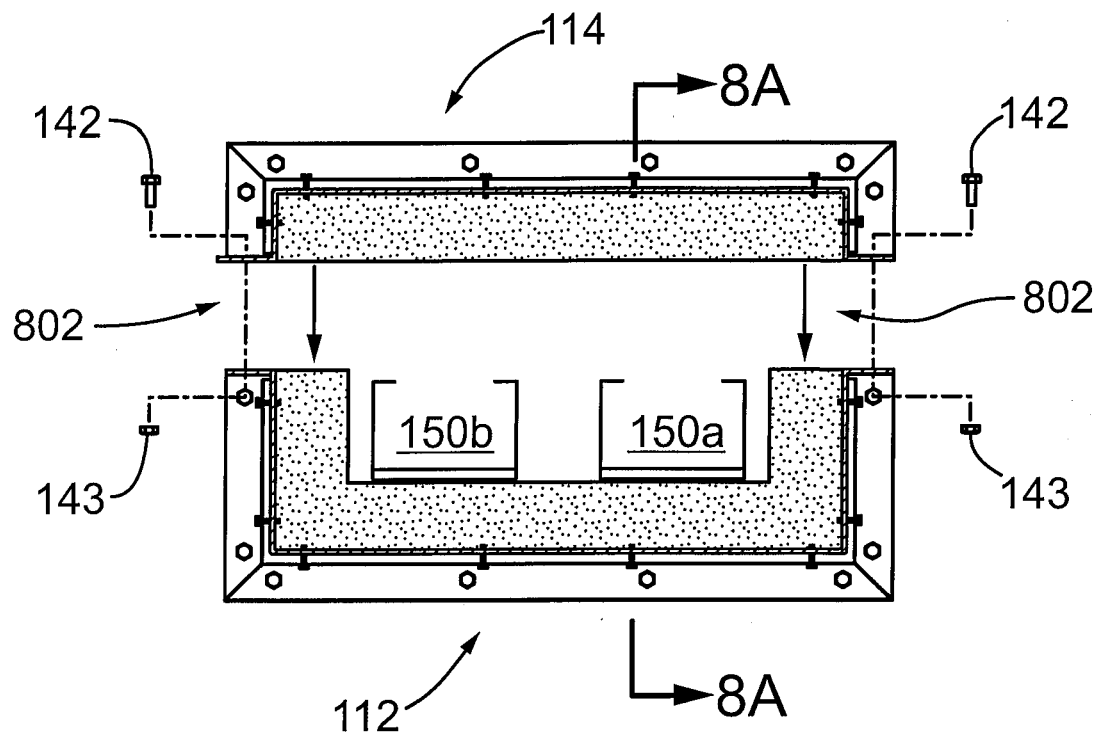
FIG. 8(a) shows a joint configuration for the cable tray or conduit enclosure according to an embodiment of the present invention.
Figure 8B:
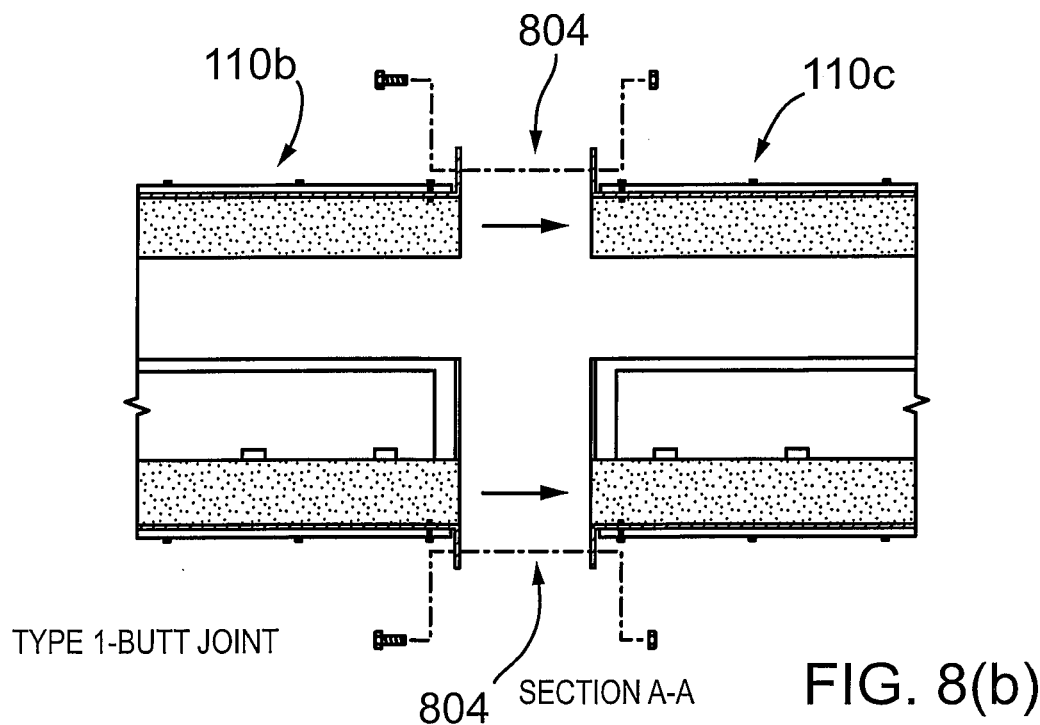
FIG. 8(b) shows a sectional view of the cable tray of FIG. 8(a) taken along the line 8A-8A.

According to another embodiment, one or more of the sections 110 and/or 120 comprise a re-enterable or accessible configuration. As shown in FIG. 1(a), one or more of the linear sections 110 and/or the corner section 120 have a removable enclosure panel or assembly. According to an embodiment, the linear section 110 includes a lower section or component indicated generally by reference 112 and an upper section or component indicated generally by reference 114. Similarly, the corner section 120 includes a lower section or component indicated by reference 122 and an upper section or component indicated by reference 124. According to an embodiment, the lower section 122 includes an outer longitudinal flange 126 and an inner longitudinal flange 127. Similarly, the upper section 124 includes a corresponding or matching outer longitudinal flange 128 and an inner longitudinal flange (not visible in FIG. 1(a)). Similarly and as more clearly shown in FIG. 2(a), the lower section 112a for the linear section 110a includes a first (i.e. an outer) longitudinal flange 116a and a second (i.e. an inner) longitudinal flange 117a. The upper section 114a includes a corresponding or matching first longitudinal flange 118a and a corresponding or matching second longitudinal flange 119a (visible in FIG. 2(b)). As shown in FIGS. 1(b) and 2(b), the lower section 112 is releasably engaged or connected to the upper section 114 of the linear section 110. According to an embodiment, the lower 114 and upper 112 sections are connected using releasable fasteners such as a bolt 142 and nut 143 as shown in FIG. 2(b). According to one aspect, the capability to remove the upper section 114 provides re-enterable access, for example, to service, repair and/or replace the cables 151 and/or to run or route new cables in the enclosure or ducting assembly. According to an embodiment, the upper 114 and lower 112 sections are connected or coupled together using a butt joint 802 as depicted in FIG. 8(a). Similarly, the transverse flange ends of the linear sections 110, for example, linear section 110b and 110c, are connected or coupled together using another butt joint 804 as depicted in FIG. 8(b).

Figure 8C:
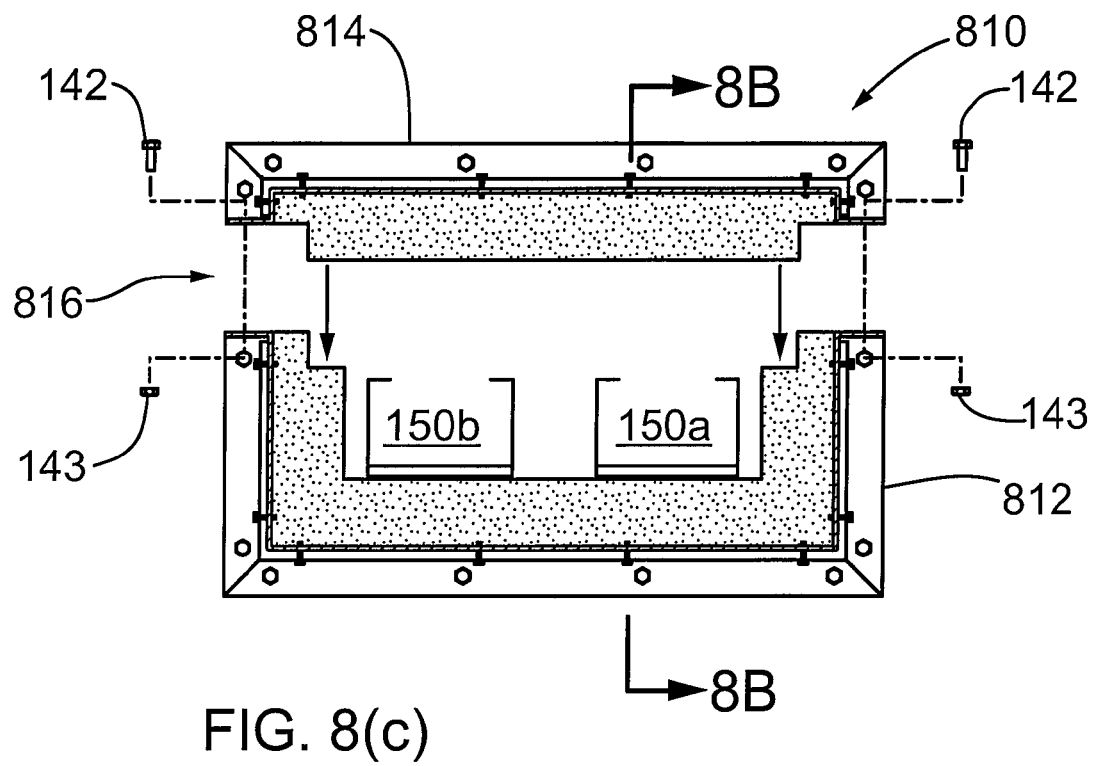
FIG. 8(c) shows a joint configuration for the cable tray or conduit enclosure according to an embodiment of the present invention.
Figure 8D:
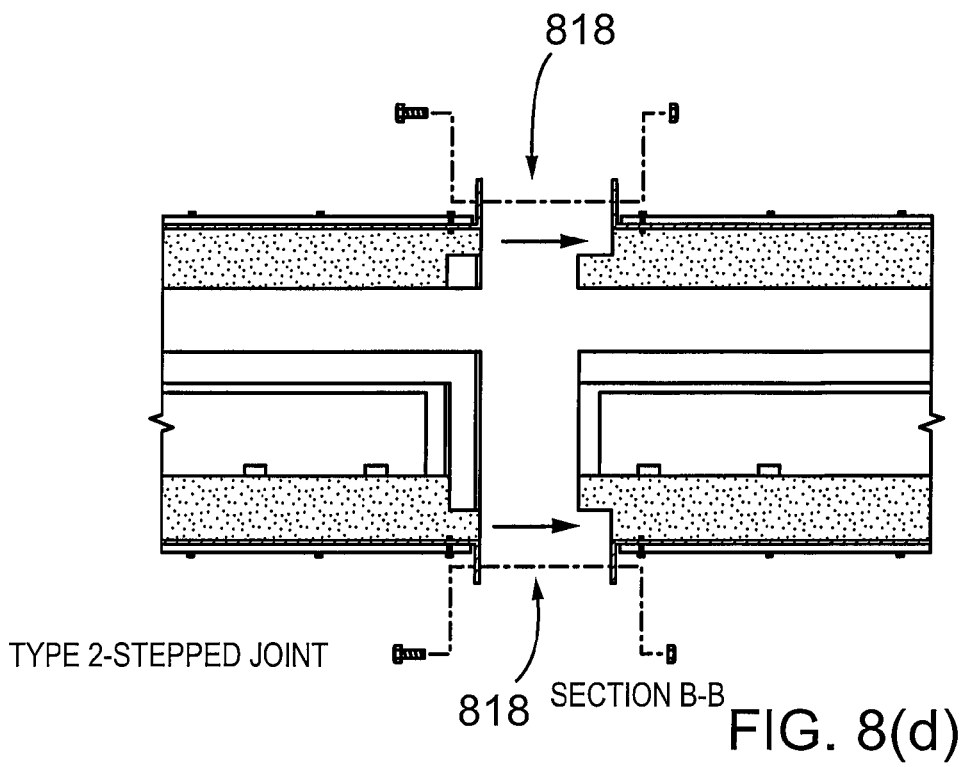
FIG. 8(d) shows a sectional view of the cable tray of FIG. 8(c) taken along the line 8B-8B.

According to another aspect and as more clearly shown in FIGS. 9(a) and 9(b), the longitudinal flanges 116, 117 (and 126, 127) include a compressible gasket 910. Similarly, the transverse flanges 130 include a compressible gasket 920. The compressible gaskets 910, 920 allow for variations in the connecting surfaces of the flanges when the various sections and/or components are joined or connected together. The gasket(s) 910 and/or 920 may comprise a ceramic paper or intumescent foam gasket or the like. For an application requiring very high thermal performance, an enclosure having stepped or shiplap joints according to an embodiment may be utilized as depicted in FIGS. 8(c) and 8(d). Referring to FIG. 8(a), the enclosure is depicted and indicated by reference 810. The enclosure 810 comprises a linear section corresponding generally to the linear section 110 of FIG. 1. The enclosure 810 comprises a lower section 812 and an upper section 814. The upper section 814 and the lower section 812 include a mating stepped joint or shiplap joint indicated by reference 816 for connecting or coupling the two sections together. The shiplap joint 816 serves to increase the thermal performance of the enclosure at the joints by increasing the length of the joint while providing an insulating air gap and an area where an intumescent gasket can be allowed to expand. Similarly, the transverse flange comprises a stepped joint or shiplap joint 818 as depicted in FIG. 8(d). According to another aspect, the gaskets 910 and 920 are recessed slightly below the mating surfaces of the longitudinal flanges and the transverse flanges, which allows the flange faces to meet while not fully compressing the gaskets thereby exerting additional stresses on the internal insulating materials and/or reducing the thermal efficiency of the gaskets 910, 920.

Figure 10A:
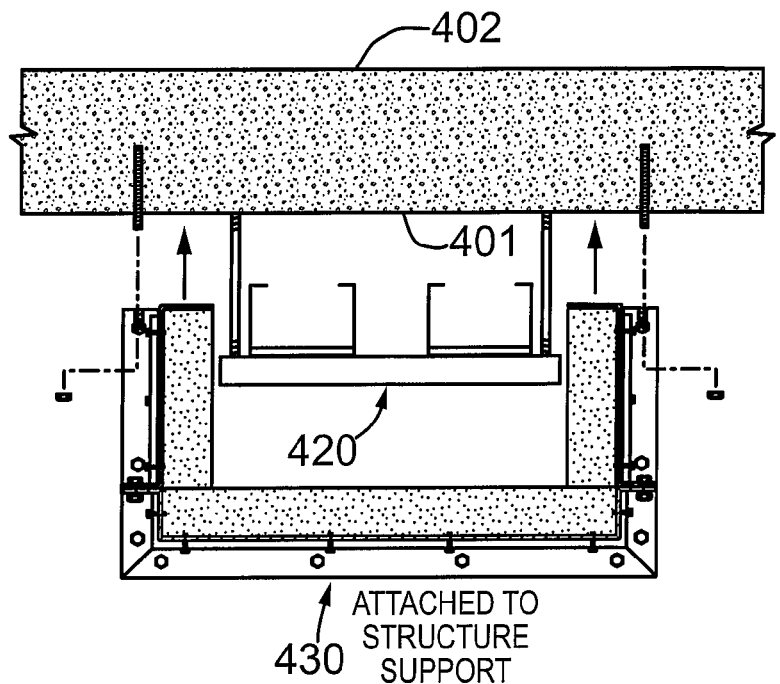
FIG. 10(a) shows an end view of an attachment or support configuration for a cable tray or conduit enclosure according to an embodiment of the present invention.
Figure 10B:
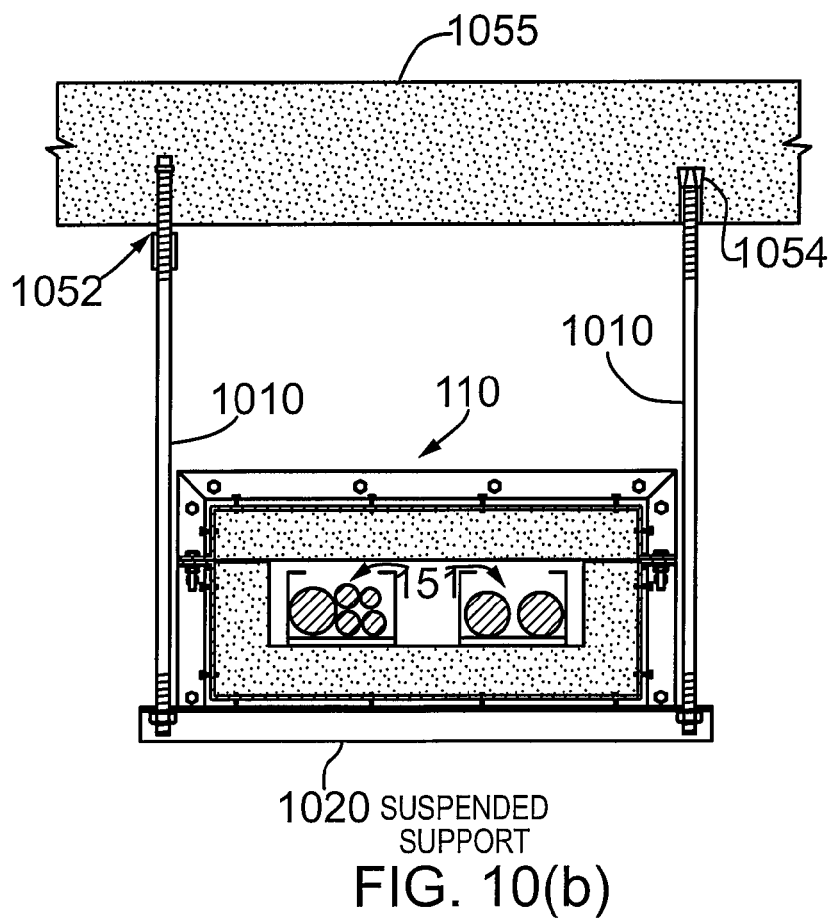
FIG. 10(b) shows an end view of another attachment or support configuration for a cable tray or conduit enclosure according to an embodiment of the present invention.

The enclosure 100 according to the embodiment depicted in FIGS. 1(a)-1(b) comprises a four-sided enclosure which may be suspended in a horizontal plane using threaded drop rods 1050 and a cradle 1060. As depicted in more detail in FIG. 10(b), the threaded drop rods 1050 are coupled to respective studs 1052 or to anchors 1054 which are attached to a support structure indicated generally by reference 1055. It will be appreciated that other types of anchors or support structures may be utilized. According to another aspect, the threaded drop rods 1050 and 1060 are sized or dimensioned to support the enclosure system 100 when fully loaded and to meet thermal and/or blast load requirements or specifications.

Figure 3A:
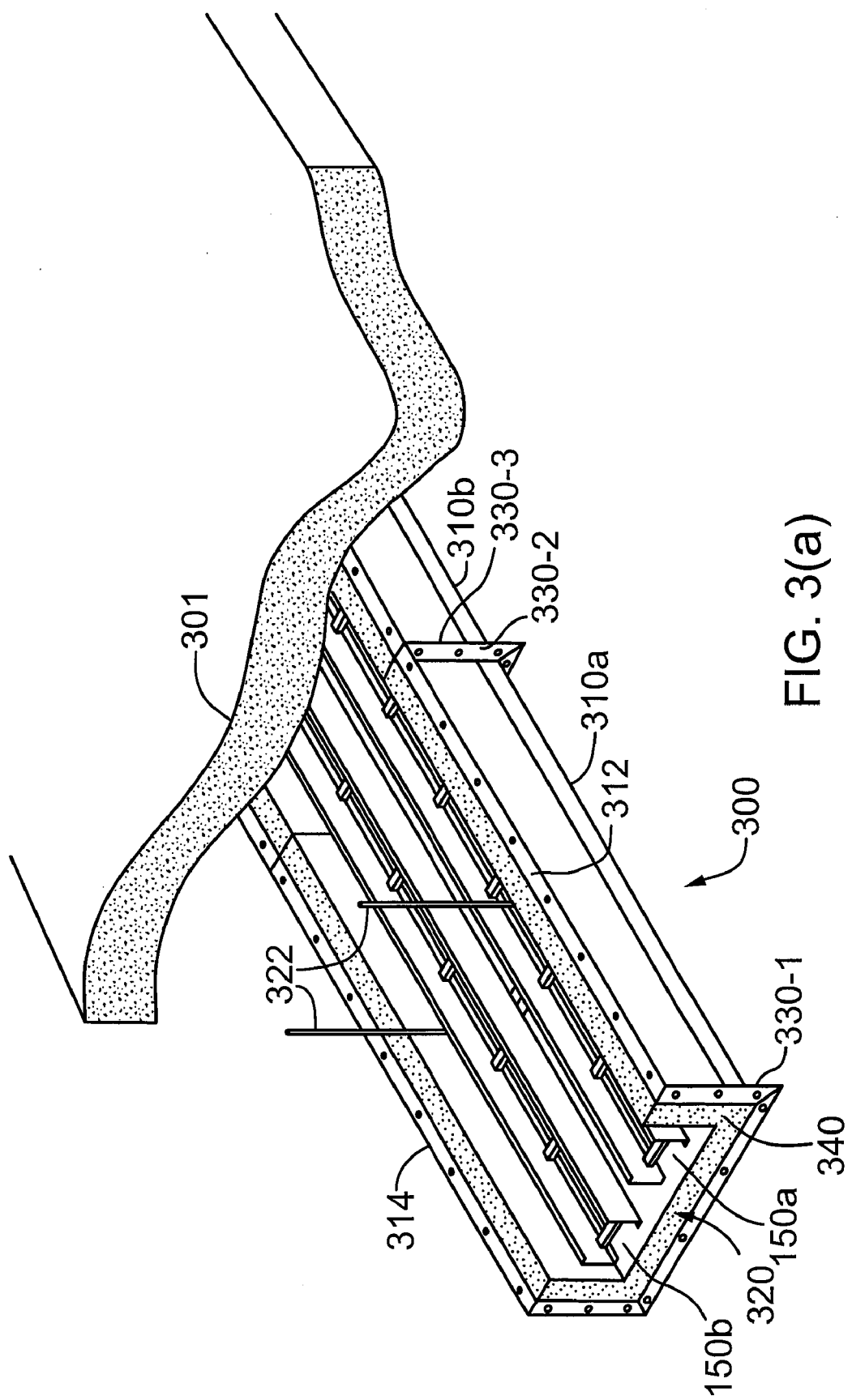
FIG. 3(a) shows a cable tray or conduit enclosure according to another embodiment of the present invention.
Figure 3B:
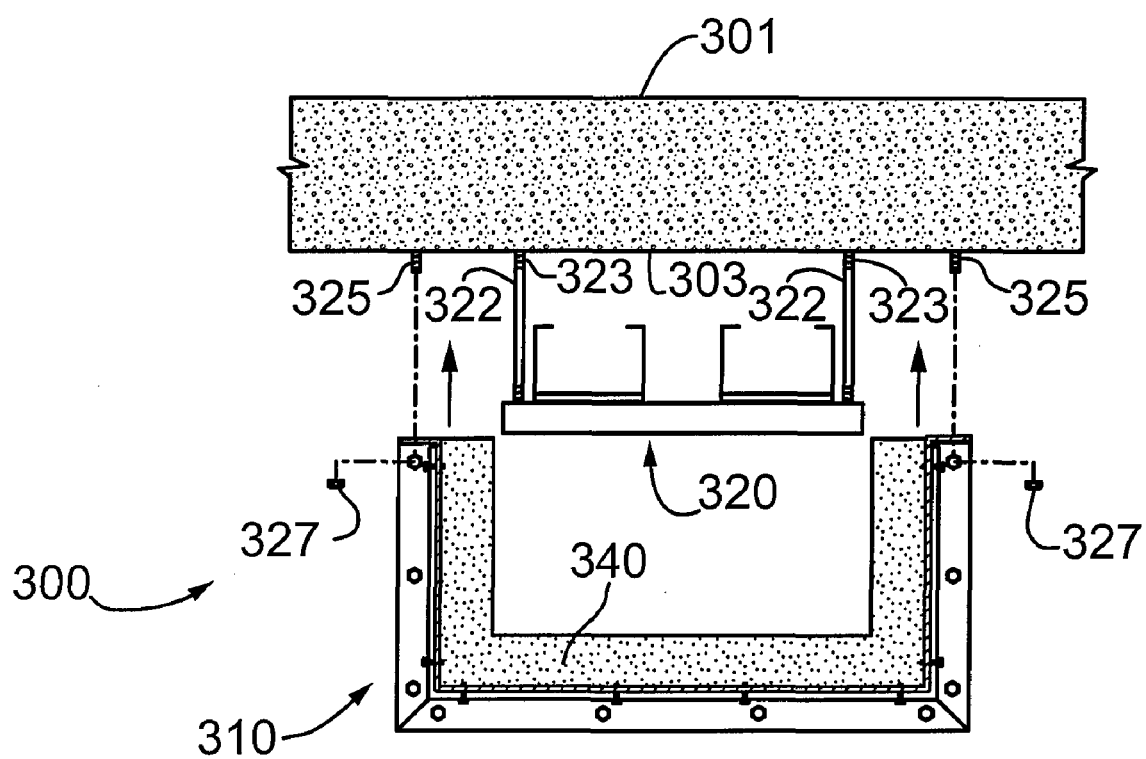
FIG. 3(b) shows an end view of the cable tray enclosure of FIG. 3(a) according to an embodiment of the present invention.

Reference is next made to FIGS. 3(a) and 3(b) which show an enclosure according to another embodiment of the invention and indicated generally by reference 300. The enclosure 300 comprises a three-sided enclosure which is mounted or secured against the surface of a support structure indicated generally by reference 301. According to an aspect, the support structure 301 provides a surface 302 for enclosing the enclosure 300. As shown, the enclosure 300 comprises one or more external or outer sections 310 (indicated individually by references 310a and 310b in FIG. 3(a)) and one or more internal cable tray support members or a platform 320. According to an embodiment, the internal cable tray support member or platform 320 is secured or mounted to the support structure 301, for example, using threaded rods 322 and studs or anchors 323 in the support surface 303 as depicted in FIG. 3(b). The internal cable tray support members 320 support one or more cable trays or conduits 324, indicated individually by reference 324a and 324b in FIG. 3. The external or outer section 310 comprises a generally rectangular configuration and includes first 312 and second 314 longitudinal flanges and a transverse flange 330 at each end. The outer sections 310 include an insulation layer 340 and may be configured or assembled in a manner similar to that described above with reference to FIG. 1. The transverse flanges 330 are configured to join or couple adjacent sections 310, for example, the outer section 310a with the outer section 310b are joined at transverse flanges 330-2 and 330-3 as depicted in FIG. 3(a). As shown in FIG. 3(a), the longitudinal flanges 312, 314 include holes or apertures 313 for receiving respective studs 325 secured or affixed to the mounting surface 303 of the support structure 301. According to an embodiment, the longitudinal flanges 312, 314 (and thereby the outer section 310) are secured to the support structure 301 using nuts 327 or other types suitable fasteners screwed onto the respective studs 325.

Figure 4A:
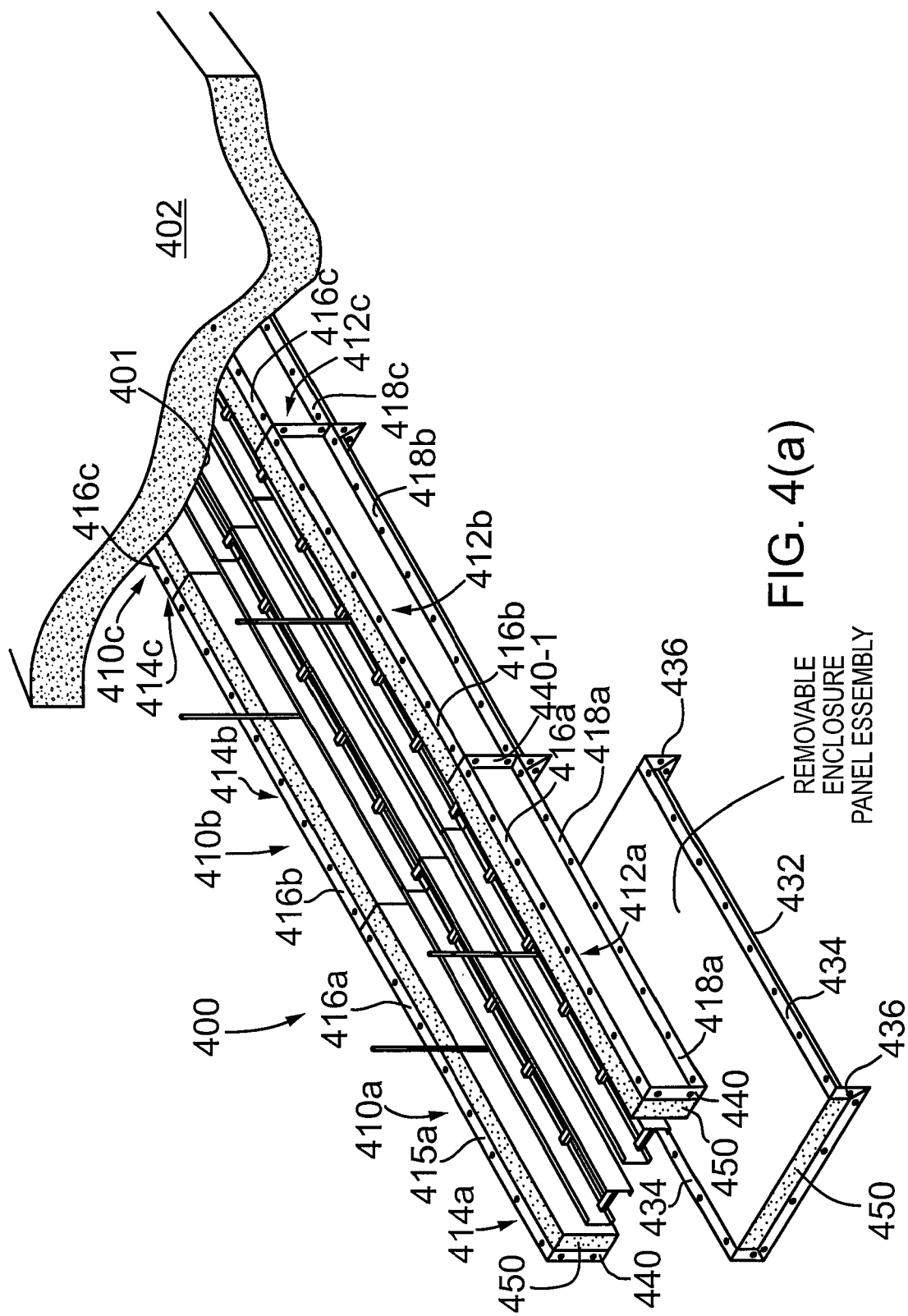
FIG. 4(a) shows a cable tray or conduit enclosure according to another embodiment of the present invention.
Figure 4B:
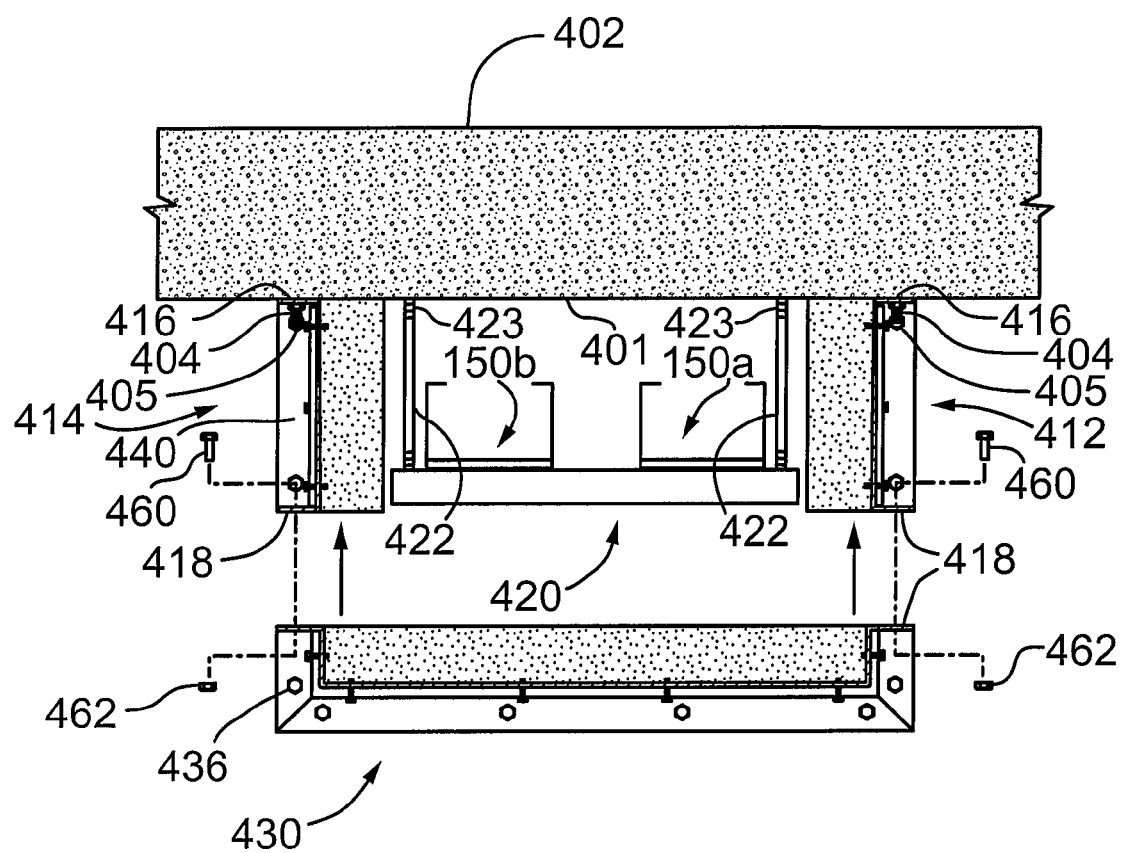
FIG. 4(b) shows an end view of the cable tray enclosure of FIG. 4(a) according to an embodiment of the present invention.

Reference is next made to FIGS. 4(a) and 4(b) which show an enclosure according to another embodiment of the invention and indicated generally by reference 400. The enclosure 400 is similar to the three-sided enclosure 300 of FIG. 3 and is attached or otherwise affixed to a surface or face 401 of a support structure 402. As shown, the enclosure 400 comprises one or more sections 410 (indicated individually by references 410a, 410b and 410c in FIG. 4(a)), with each section 410 including a pair of outer side walls 412, 414, one or more inner cable tray support members 420, and a removable panel 430. Each of the outer side walls 412, 414 includes an upper longitudinal flange 416 and a lower longitudinal flange 418. As shown, each of the outer walls 412, 414 also include an end flange 440 for joining or coupling adjacent sections (e.g. the sections 410a and 410b). The inner support member(s) 420 is configured to support or carry one or more cable trays or conduits 150a, 150b as depicted in FIG. 4(b). The removable panel 430 is configured to provide access to the interior of the enclosure 400, for example, once the enclosure 400 has been mounted or installed in place. According to an embodiment, the removable panel comprises a pair of longitudinal flanges 434 and a pair of transverse flanges 436 which are configured or joined to provide a frame or support structure for supporting an insulation panel 450 and an outer covering or panel 432, for example, a fire resistant and/or blast resistant panel as described above. Each of the outer walls 412, 414 also includes an installed insulation panel 450.

According to an embodiment and as shown in FIG. 4(b), the internal cable tray support member or platform 420 is secured or mounted to the face 401 of the support structure 402, for example, using threaded rods 422 and studs or anchors 423 in the support surface 402. Each of the outer walls 412, 414 is positioned adjacent the internal cable tray platform 420 and secured to the support structure 402 using studs 404 and fasteners 405 mounted through holes on the respective longitudinal flanges 416 as depicted in FIG. 4(b). The removable panel 430 is secured or coupled to the bottom of each the sections 410 using bolts 460 and nuts 462 or other suitable fasteners inserted and tightened through holes in the corresponding longitudinal flanges 418, 434. Similarly, the transverse or end flanges 436 and 440 are secured or joined together. As described above, gaskets may be utilized. The removable panel 430 can be removed by unscrewing the bolts/nuts 460, 462 to provide access to the interior of the enclosure 400 and/or the cable tray support member(s) 430 and/or any cables.

Figure 5A:
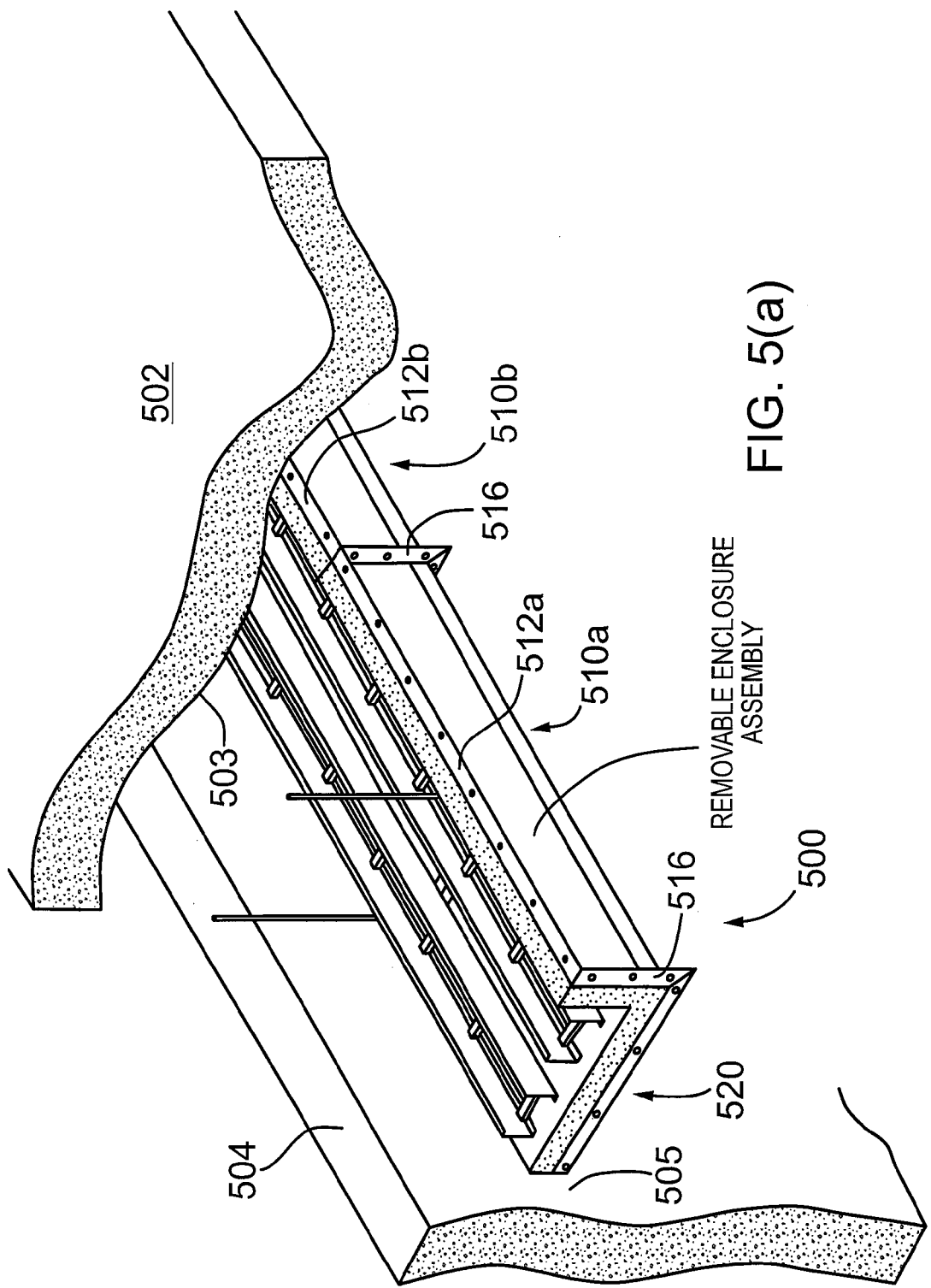
FIG. 5(a) shows a cable tray or conduit enclosure according to another embodiment of the present invention.
Figure 5B:
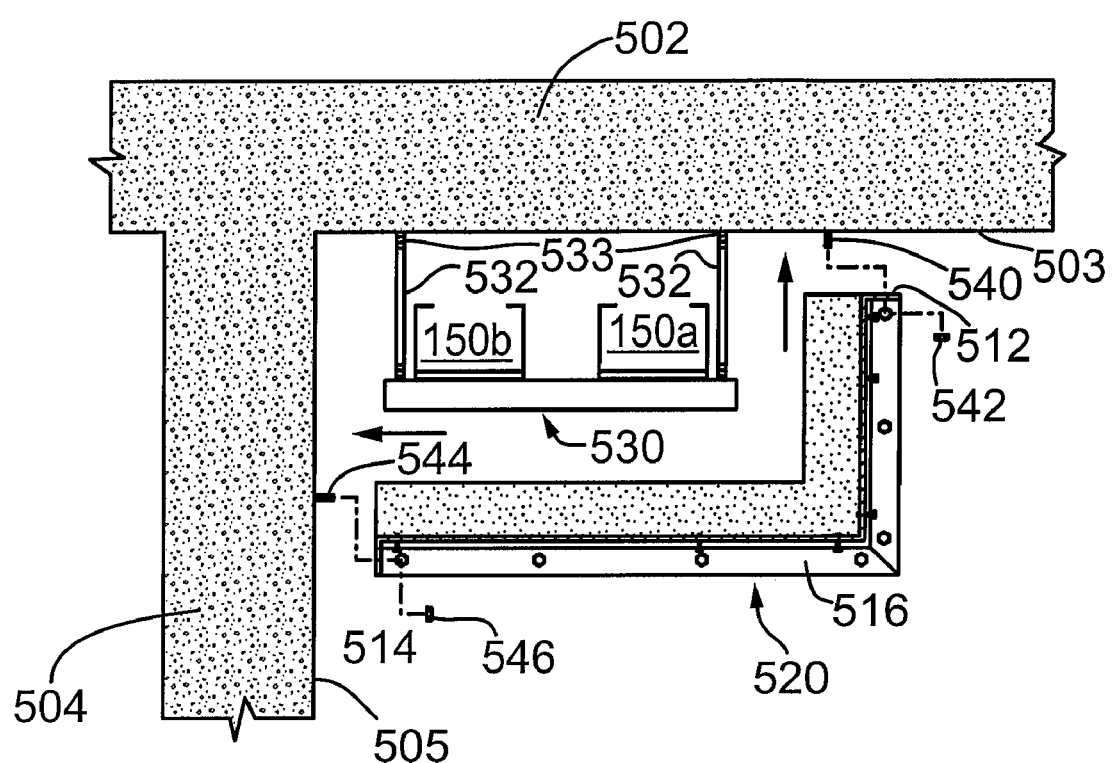
FIG. 5(b) shows an end view of the cable tray enclosure of FIG. 5(a) according to an embodiment of the present invention.

Reference is next made to FIGS. 5(a) and 5(b) which show an enclosure according to another embodiment of the invention and indicated generally by reference 500. The enclosure 500 comprises a two-sided enclosure configuration and is similar to the three-sided enclosure 300 of FIG. 3 and is attached or otherwise affixed to a horizontal support structure 502 and an adjacent vertical structure 504. As shown, the enclosure 500 comprises one or more sections 510 (indicated individually by references 510a and 510b in FIG. 5(a)), with each section 510 comprising a removable enclosure assembly 520 and one or more inner cable tray support members or a platform 530. Each of the sections 510 includes a longitudinal top flange 512, a longitudinal side flange 514, and a transverse flange 516 at each end. The sections 510 are joined together by connecting the respective transverse flanges 516.

As shown in FIG. 5(b), the internal cable tray support member(s) 530 is secured or mounted to a face 503 of the support structure 502, for example, using threaded rods 532 and studs or anchors 533 in the support surface 503. As also shown in FIG. 5(b), the removable enclosure section 520 is mounted over the cable tray support member 530 and attached to the surface 503 of the horizontal support structure 502 using studs 540 extending through holes in the longitudinal top flange 512 and secured with nuts 542 or other suitable fasteners. Similarly, removable enclosure section 520 is secured to the vertical support structure 504 using studs 544 extending through holes in the longitudinal side flange 514 and secured with nuts 546 or other suitable removable fasteners.

Figure 6B:
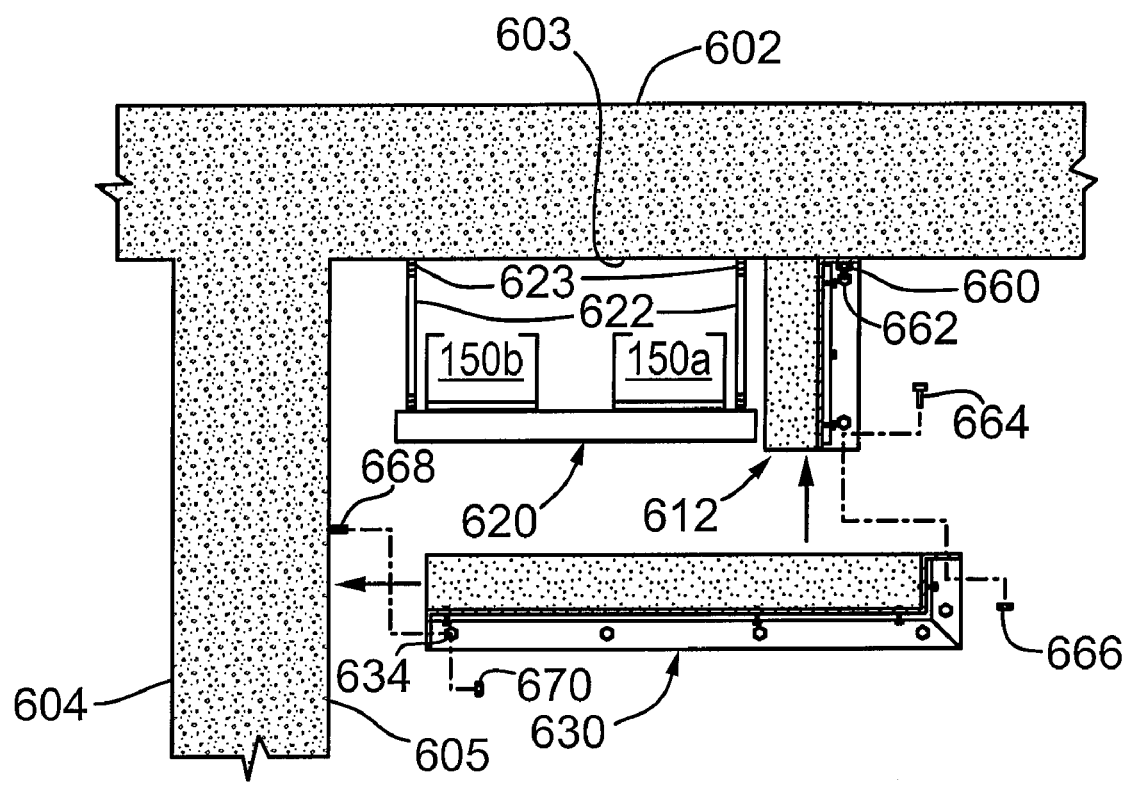
FIG. 6(b) shows an end view of the cable tray enclosure of FIG. 6(a) according to an embodiment of the present invention.

Reference is next made to FIGS. 6(a) and 6(b) which show an enclosure according to another embodiment of the invention and indicated generally by reference 600. The enclosure 600 comprises a two-sided enclosure configuration and is similar to the enclosure 400 of FIG. 4 and is attached or otherwise affixed to a horizontal support structure 602 and an adjacent vertical support structure 604. As shown, the enclosure 600 comprises one or more sections 610 (indicated individually by references 610a and 610b in FIG. 6(a)), with each section 610 including an outer side wall 612, an inner cable tray support member or platform 620, and a removable panel 630. The outer side wall 612 includes an upper longitudinal flange 614 and a lower longitudinal flange 616. The outer side wall 612 also includes an end flange 618 for joining or coupling adjacent sections (e.g. the sections 610a and 610b). The inner support member 620 is configured to support or carry one or more cable trays or conduits 150a, 150b as depicted in FIG. 6(b). The removable panel 630 is configured to provide access to the interior of the enclosure 600, for example, once the enclosure 400 has been mounted or installed in place. According to an embodiment, the removable panel comprises a longitudinal flange 632, a longitudinal side flange 634 (FIG. 6(b)) and a pair of transverse flanges 636 which are configured or joined to provide a frame or support structure for supporting an insulation panel 640 and an outer covering or panel 642, for example, a fire resistant and/or blast resistant panel as described above. As shown, the outer wall 612 also includes an installed insulation panel 650.

According to an embodiment and as shown in FIG. 6(b), the internal cable tray support member or platform 620 is secured or mounted to a face 603 of the horizontal support structure 602, for example, using threaded rods 622 and studs or anchors 623 in the support surface 603. The outer wall 612 is positioned adjacent the external side of the internal cable tray support member 620 and secured to the support structure 602 using studs 660 and fasteners 662 mounted through holes on the longitudinal top flange 614 as depicted in FIG. 6(b). The removable panel 630 is secured or coupled on one side to the bottom of the outer wall 612 using bolts 664 and nuts 666 or other suitable fasteners inserted and tightened through holes in the corresponding longitudinal flanges 616 and 632. The other side of the removable panel 630 is secured or attached to the vertical support structure using studs 668 and nuts 670 (FIG. 6(b)) inserted and tightened through holes in the longitudinal side flange 634 as indicated in FIG. 6(b). The transverse or end flanges are bolted together or fastened to secure or joined adjacent sections 610a and 610b, and as described above, gaskets may be utilized to provide additional sealing across the joints. The removable panel 630 can be removed by unscrewing the bolts/nuts 664/666 and the nuts 670 to provide access to the interior of the enclosure 600 and/or the cable trays 150a, 150b and/or any cables.

Figure 7A:
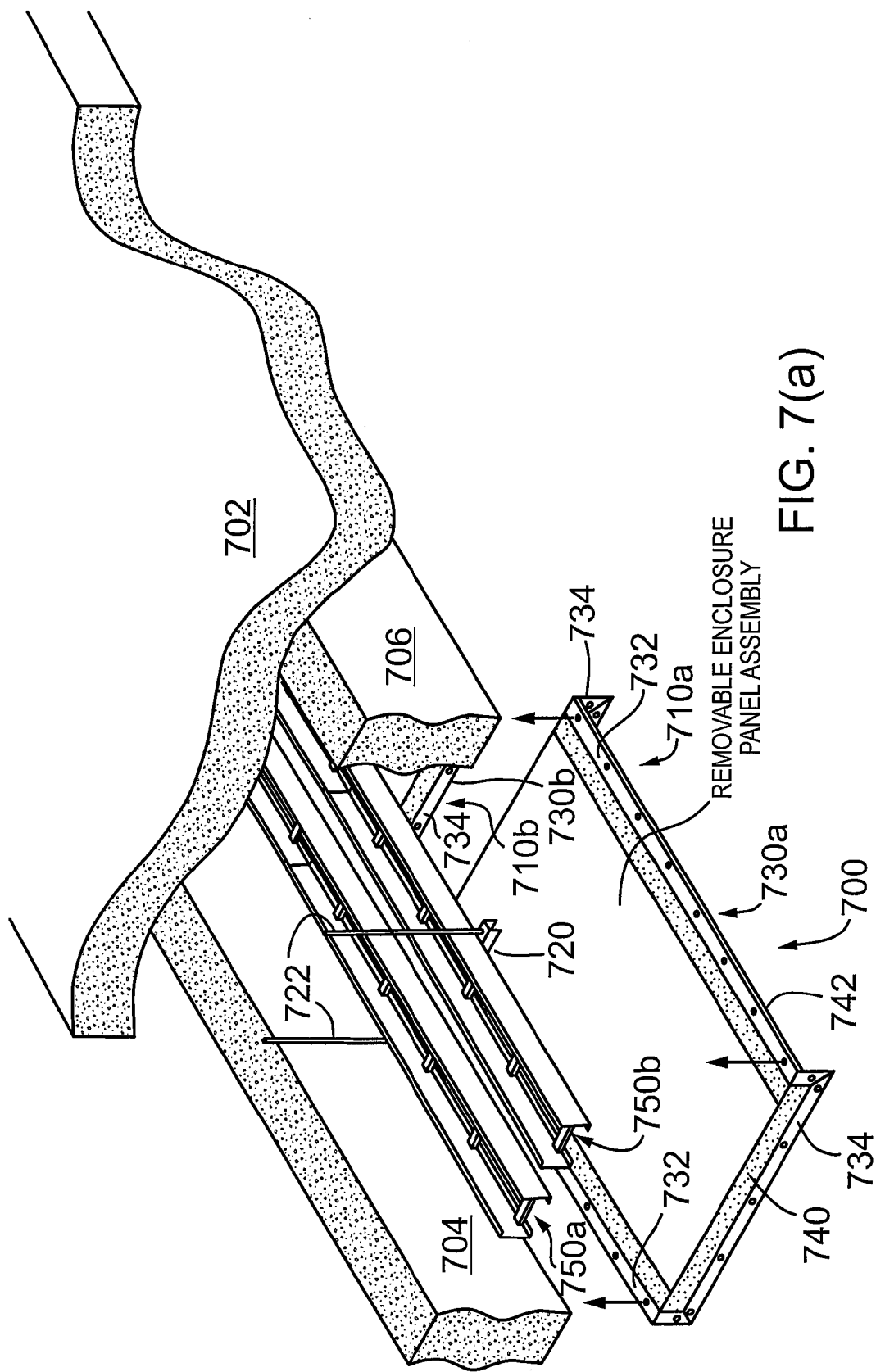
FIG. 7(a) shows a cable tray or conduit enclosure according to another embodiment of the present invention.
Figure 7B:
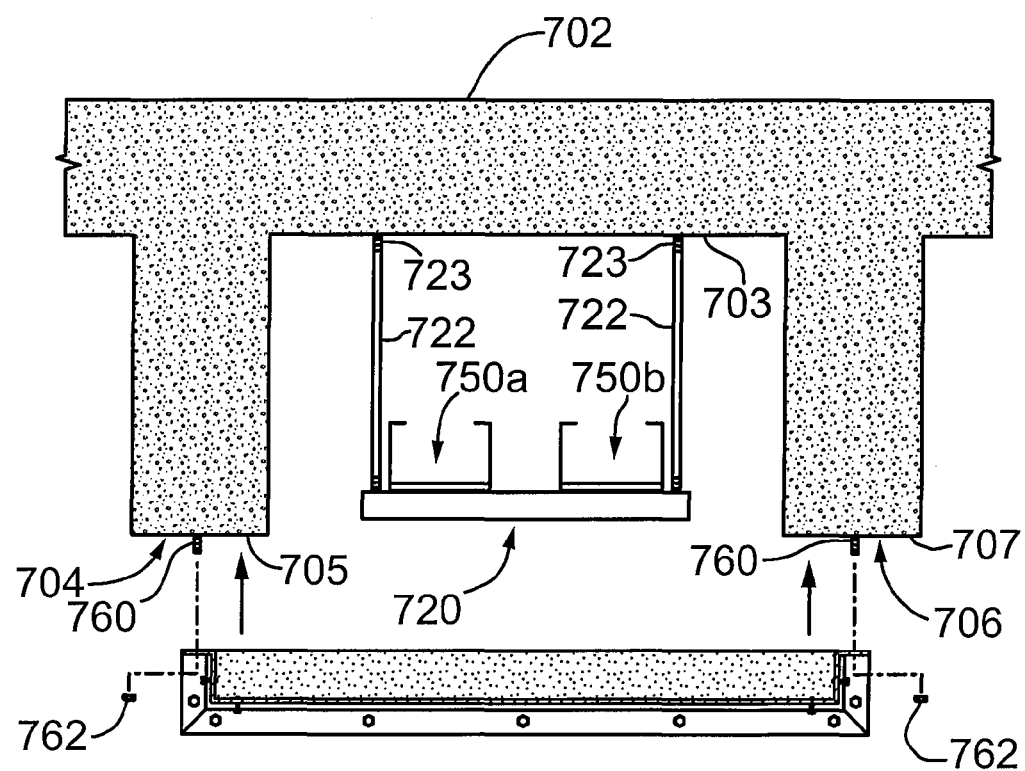
FIG. 7(b) shows an end view of the cable tray enclosure of FIG. 7(a) according to an embodiment of the present invention.

Reference is next made to FIGS. 7(a) and 7(b) which show an enclosure configuration according to another embodiment of the invention and indicated generally by reference 700. The enclosure 700 comprises a single-sided enclosure which configured to support one or more cable trays or conduits 750, indicated individually by references 750a and 750b in FIG. 7, from a horizontal support structure 702 and positioned between adjacent vertical support structures 704, 706, for example, as depicted in FIG. 7(b). The enclosure 700 comprises one or more sections 710, indicated individually by references 710a and 710b in FIG. 7(a). Each of the sections 710 includes one or more cable tray support members or platforms 720 and a removable access panel 730. As shown, the horizontal support structure 702 and the vertical support structures 704, 706 form a channel or recess in which one or more of the cable trays 750 are suspended or supported using a plurality of the cable support members or platforms 720. As shown in FIG. 7(b), the cable support member(s) 720 are secured to a face 703 of the horizontal support structure 702 using threaded rods 722 connected to corresponding studs 723 in the horizontal support structure 702. The vertical support structures 704, 706 are utilized as the side walls of the enclosure 700 and comprise or are formed from a fire resistant and/or blast resistant material, such as concrete blocks, reinforced poured concrete, steel and other such materials or structures.

Referring to FIG. 7(a), the removable access panel 730 comprises a pair of longitudinal flanges 732 and a pair of transverse flanges 734 which are configured or joined to provide a frame or support structure for supporting an insulation panel 740 and an outer covering or panel 742, for example, a fire resistant and/or blast resistant panel as described above. The transverse flanges 734 are configured for joining or connecting adjacent sections 710 of the enclosure 700, for example, the section 710a and the section 710b (partially shown in FIG. 7(a)). As shown in FIG. 7(b), the removable access panel 730 is mounted in place by studs 760 in the vertical support structures 704, 706 which extend through holes in the longitudinal flanges 732 and are secured by nuts 762 or other removable type fasteners.

According to another aspect or embodiment, the sections, e.g. the linear or straight sections 110 (FIG. 1) and the corner sections 120 (FIG. 1), are factory-fabricated and assembled around existing electrical installations in the field. According to another embodiment, the lower sections, e.g. the lower section 112 for the straight sections 110 (FIG. 1) and the lower section 122 for the corner sections 120 (FIG. 1), are installed to provide a support and/or attachment point for new cable or conduit installations. After the installation of the interior cables, electrical equipment/components or control equipment, is completed, the removable panels or upper sections, e.g. the upper section 114 for the straight sections 110 (FIG. 1) and the upper section 124 for the corner sections 120 (FIG. 1), are installed to complete the enclosure. This embodiment is suitable for new electrical installations, In summary and according to one aspect, the apparatus according to an embodiment of the present invention provides an enclosure for housing one or more cable trays or conduits and providing fire and/or blast protection. According to an embodiment, the enclosure is constructed to provide a fire resistance rating of up to 3 hours according to the requirements of the NRC Generic Letter (GL) 86-10 Supplement 1.

In summary and according to another embodiment of the present invention, the apparatus includes a re-enterable or access mechanism to provide access to the interior of the enclosure for such activities as repairing, replacing, re-routing, removing cable(s) or installing new cable(s). According to another aspect, the access mechanism may be utilized to provide additional ventilation, for example, during maintenance periods or other non-critical operational times.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for enclosing one or more cable trays, said apparatus comprising:

an enclosure comprising a frame including a plurality of longitudinal members joined together to form a generally rectangular structure having four sides comprising exterior walls formed of a protective material;

said one or more exterior walls having an interior surface;

an insulation layer affixed to at least a portion of the interior surface of at least one of said one or more exterior walls; and an air gap formed to span at least a portion of a space between said insulation layer and the interior surface of the at least one of said one or more exterior walls.

2. The apparatus as claimed in claim 1, wherein said protective material comprises a fire resistant material or a blast resistant panel or both.

3. The apparatus as claimed in claim 2, further including flashings for substantially covering each corner edge of the said frame.

4. The apparatus as claimed in claim 2, wherein said enclosure comprises a plurality of sections, each of said sections including a first transverse flange configured at one end of said frame and a second transverse flange configured at another end of said frame, and each of said transverse flanges being configured for adjoining adjacent sections.

5. An enclosure for enclosing one or more cable trays, said enclosure comprising:

a frame configured for supporting one or more exterior panels, and each said exterior panels comprising a protective material;

said one or more exterior panels having an interior surface;

an insulation layer affixed to at least a portion of the interior surface of at least one of said one or more exterior panels;

an air gap formed to span at least a portion of a space between said insulation layer and the interior surface of the at least one of said one or more exterior panels; and a removable panel for accessing the interior of said enclosure.

6. The apparatus as claimed in claim 5, wherein said protective material comprises a fire resistant material or a blast resistant material or both.

* * * * *